United States Patent [19]

Maruoka et al.

[11] 3,896,913

[45] July 29, 1975

[54] THROTTLE AND IGNITION TIMING CONTROLLED BY CLUTCH AND TRANSMISSION

[75] Inventors: Hiroyuki Maruoka, Yokohama; Giichi Shioyama, Yokosuka, both of Japan

[73] Assignee: Nissan Motor Company Limited, Yokohama, Japan

[22] Filed: Apr. 5, 1973

[21] Appl. No.: 348,027

[30] Foreign Application Priority Data
Apr. 28, 1972 Japan.............................. 47-43185
Sept. 12, 1972 Japan............................ 47-106283

[52] U.S. Cl................ 192/.062; 74/873; 123/117 R; 60/289; 192/.084
[51] Int. Cl.......................... F02p 5/04; F16d 23/00
[58] Field of Search....... 123/117 R, 117 A; 60/289, 60/290; 74/.092, 873; 192/.046, .062, .084, 192/.092

[56] References Cited
UNITED STATES PATENTS

| | | |
|---|---|---|
| 3,486,595 | 12/1969 | Turner.............................. 123/117 A |
| 3,547,088 | 12/1970 | Yagi................................ 123/117 A |
| 3,556,064 | 1/1971 | Yamazaki et al..................... 74/873 |
| 3,680,318 | 8/1972 | Nakajima......................... 123/117 A |
| 3,716,991 | 2/1973 | Tatsutomi....................... 123/117 R |
| 3,718,126 | 2/1973 | Oishi............................. 123/117 A |
| 3,752,128 | 8/1973 | Tatsutomi....................... 123/117 A |
| 3,756,208 | 9/1973 | Toda et al..................... 192/.062 X |
| 3,776,205 | 12/1973 | Maruoka....................... 123/117 R |

*Primary Examiner*—Benjamin W. Wyche

[57] ABSTRACT

An ignition timing control change-over system for an automotive internal combustion engine which has a spark retarding point in addition to a normal or spark advancing point. The system employs a change-over type relay switch for selectively and independently connecting either the spark advancing or the retarding point to the ignition coil in response to particular operating conditions of the engine. Under certain idling conditions of the engine, the spark retarding point of the distributor is connected to the ignition coil, and at the same time the throttle valve of the engine is opened by a throttle opener for temporarily increasing the engine speed to attain prompt warm-up of the engine and also of the exhaust gases. Unburned hydrocarbons and carbon monoxide contained in the exhaust may be reduced by a considerable degree as a result of this retarded control of the ignition timing under certain idling conditions of the engine.

3 Claims, 9 Drawing Figures

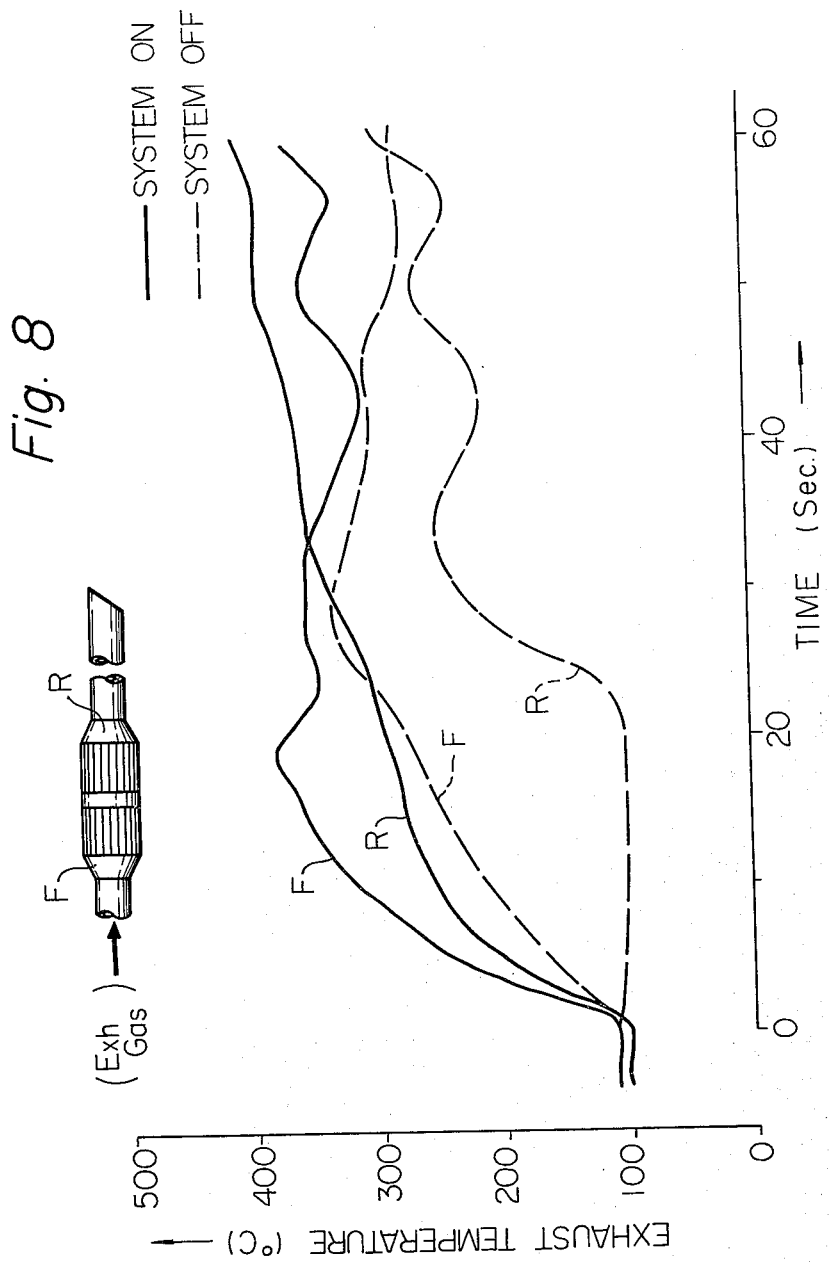

THROTTLE AND IGNITION TIMING CONTROLLED BY CLUTCH AND TRANSMISSION

This invention relates as indicated to an ignition timing change-over system for an internal combustion engine, and more particularly to an ignition timing change-over system whereby the ignition timing is switched from a spark advance to a spark retard and at the same time the throttle valve of the engine is opened during idling under low temperature running conditions for attaining prompt warm-up of the engine and the exhaust gases for the purpose of reducing the emission of pollutants.

It is an object of the present invention to provide an ignition timing change-over system for an internal combustion engine, which is capable of the causing a reduction in the content of harmful pollutants in the exhaust gases emitted from the engine under idling and low temperature running conditions.

It is another object of the present invention to provide an ignition timing change-over system for an internal combustion engine, which provides fast warm-up of the engine and of the exhaust gases.

It is still another object of the present invention to provide an ignition timing change-over system for an internal combustion engine, which employs a change-over type relay switch for positively switching the ignition timing from a spark advance to a spark retard under idling and low-temperature running conditions of the engine.

It is a further object of the present invention to provide an ignition timing change-over system for an internal combustion engine, which employs a throttle opener for opening the throttle valve of the engine upon change-over to the retarded ignition timing.

It is a still further object of the present invention to provide an ignition timing change-over system for an internal combustion engine, which is capable of employing a variety of combinations of switches for actuating the change-over relay and a throttle opener in response to different variables indicating idling and low temperature running conditions of the engine.

It is a still further object of the present invention to provide an ignitiion timing change-over system for an internal combustion engine, which is simple in construction, reliable in operation and low in production costs.

According to the invention, there is provided an ignition timing change-over system of motor vehicles, comprising an ignition timing change-over system for a vehicle internal combustion engine having an intake manifold, a throttle valve, an acceleration control member, a gear shift lever and a pedal actuated clutch, the system comprising, in combination: an ignition coil, a distributor provided with an ignition spark advancing point and an ignition spark retarding point, a relay switch, the coil of which is normally de-energized for the switch to connect the ignition spark advancing point to the ignition coil, a dc power source, an ignition change-over circuit arranged to close when the engine is idling under given conditions for connecting the relay switch coil through an ignition switch to the dc power source to energize the relay switch coil causing the relay switch to switch and connect the ignition spark retarding point with the ignition coil; and a throttle valve opener comprising solenoid means connected in parallel with the relay switch coil for opening the throttle valve when the ignition change-over circuit is closed and the ignition spark retarding point is connected to the ignition coil.

The timing change-over circuit mentioned above may be formed from a combination of thermostatically controlled switch which is adapted to close when the engine temperature is below a predetermined level, a clutch switch which is adapted to close when a clutch pedal is depressed, and a neutral switch which is adapted to close when the gear shift lever is in the neutral position.

In another preferred embodiment, the timing change-over circuit may be formed from a combination of a thermostatically controlled switch which is adapted to close when the engine temperature is below a predetermined level, a speed switch which is adapted to close when the vehicle speed is below 10 MPH, and an accelerator pedal switch which is adapted to close when an accelerator pedal of the vehicle is released.

Furthermore, the timing control change-over switch may be formed from a combination of a thermostatically controlled switch which is mounted on a catalytic converter in the exhaust system of the engine and adapted to close at a catalyst temperature below 300°C or other suitable predetermined level, a speed switch which is adapted to close when the vehicle is immobile, and a throttle switch which is adapted to close when the throttle valve of the engine is in idle position.

Advantageously, the throttle opener mentioned above comprises a three-way solenoid valve and a spring loaded diaphragm motor operatively connected to the throttle valve of the engine by way of a connecting rod. The three-way valve is provided with a housing which has a first port communicating with the atmosphere, a second port communicating with a vacuum chamber of the diaphragm and with the first port, and a third port communicating with an intake manifold of the engine, a valve means accommodated within the housing and adapted to move upon energization of the solenoid for bringing the second port into communication with the third port for applying intake manifold vacuum to the vacuum chamber of the diaphragm motor thereby to move said connecting rod in a direction to open the throttle valve.

The above and other objects, features and advantages of the present invention will become more obvious from the following description when taken in connection with the accompanying drawings which show, for purposes of illustration only, several embodiments in accordance with the present invention, wherein like parts and designated by like reference numerals and characters, and in which:

FIG. 8 is a graphical representation of the warm-up effects obtained by the present invention.

Figure 1:
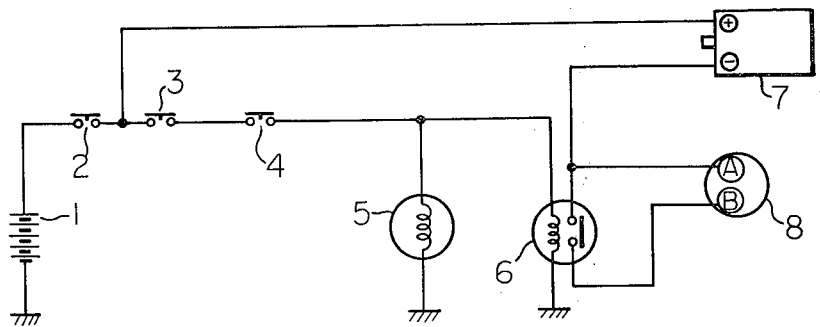
FIG. 1 is a diagram of a prior art ignition timing change-over system by the present inventors, which provides a basis of the present invention.
Figure 2:
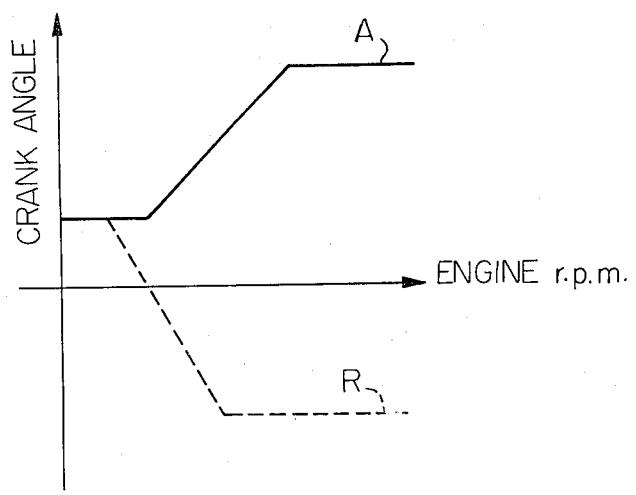
FIG. 2 is a graphical representation of the spark advance and retard change-over operation of the system shown in FIG. 1.

Referring to FIG. 1, there is shown a basic form of an ignition timing change-over system developed by the present inventors. The present invention intends to provide improvements over the basic ignition control change-over system. The basic system comprises a d.c. power source in the form of a battery 1, an ignition switch 2, a thermostatic switch 3, a neutral switch 4, a throttle opener 5, a relay switch 6, an ignition coil 7 and a dual point distributor 8. The dual point distributor 8 is provided with a spark advancing point A and a spark retarding point R with advance and retard characteristics as shown in FIG. 2. In this basic form of the change-over system, the thermostatic switch 3 and neutral switch 4 are adapted to close under low engine temperature running conditions to energize the throttle opener 5 for opening the throttle valve 5b (FIG. 4) and at the same time to energize the relay 6 to close its contacts for connecting the spark retarding point R of the distributor 8 to the ignition coil 7 to give an ignition timing of retarded characteristics through the point R.

Figure 3A:
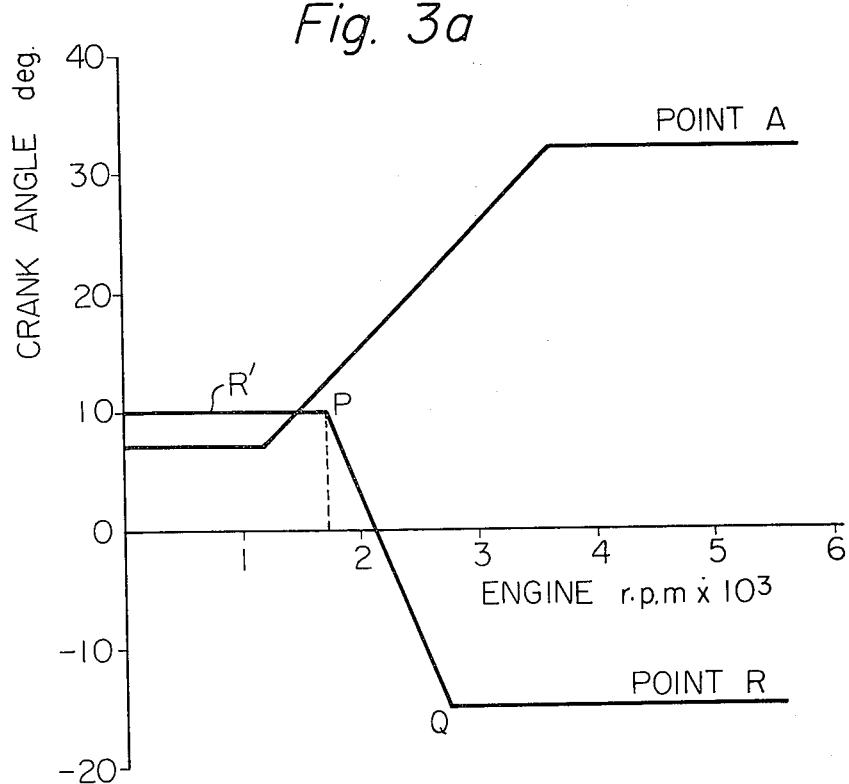
FIG. 3a is a view similar to FIG. 2 but showing the change-over operation according to the present invention.

In general, an optimum engine start is obtained with an ignition timing set at 10° to 20° BTCD (before top dead center). This is more advanced than the normal ignition timing after warm-up of the engine which is generally in the range of 5° to 10° BTDC. It is therefor considered advantageous to set the ignition timing during engine cranking (up to 400 r.p.m.) at a more advanced angle than that which would normally be established by the point A of the distributor 8 (see R' of FIG. 3a). This spark advance should preferably be extended up to 1,700 r.p.m. (point P) for the purpose of stabilizing the engine operation.

Figure 4:
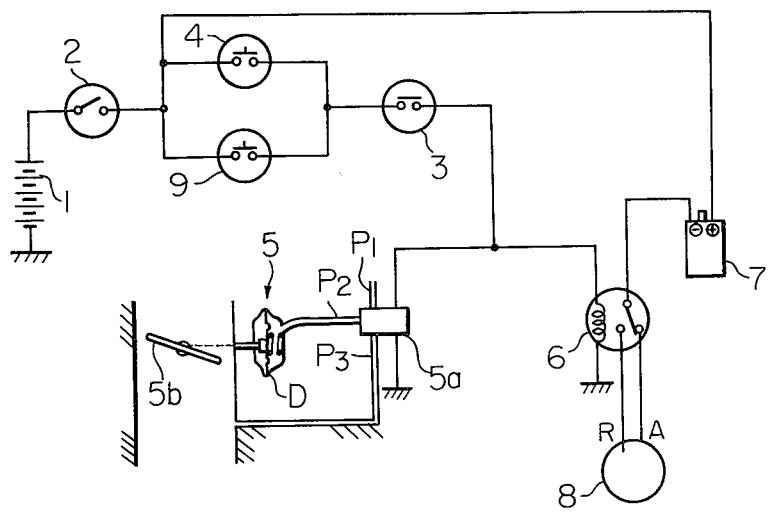
FIG. 4 is a diagram of a preferred embodiment of the present invention.

In order to make the operation of the basic change-over system of FIG. 1 more effective, it is preferred to insert a clutch switch 9 in parallel relation with the neutral switch 4 as shown in FIG. 4. This clutch switch 9 is adapted to close when the clutch pedal of the vehicle is depressed. The operation mode of the ignition timing change-over system of FIG. 4 is diagrammatically illustrated in FIG. 3a.

Figure 3B:
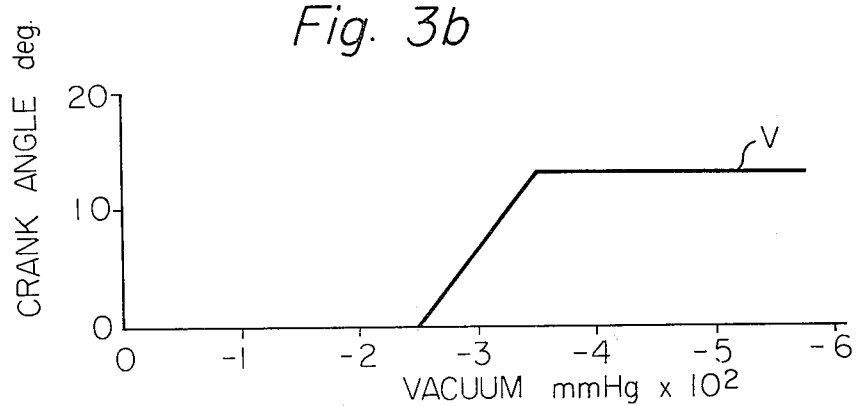
FIG. 3b is a graphical representation of vacuum advance at point A of the system.

The engine, however, becomes stabilized when the engine speed is increased to a certain level, so that the action of the common centrifugal governor may be locked, for example, at 2,700 r.p.m. (point Q of FIG. 3a) to maintain the ignition timing constant thereafter. Regarding vacuum advance, optimum driving conditions of the motor vehicle can be obtained by imparting to the spark advancing point A an advancing characteristic as shown at V in FIG. 3b.

The embodiment of FIG. 4 employs a change-over type relay switch in place of the on-off type shown in FIG. 1 to comply with the change in the mode of operation at low engine speeds where the advance point A is used as mentioned hereinabove. In the basic ignition timing control change-over system of FIG. 1, the ignition timing is determined by one of the two spark control points which is more retarded than the other. However, the embodiment of FIG. 4 employs a change-over type relay switch for positively and selectively connecting either the spark advance point A or the spark retard point R to the ignition coil to ensure increased reliability of operation.

As mentioned hereinbefore, the clutch switch 9 is in parallel relation with the neutral switch 4. This clutch switch 9 is adapted to close when the clutch pedal of the vehicle is depressed or the clutch disc is uncoupled. The provision of the parallel clutch switch 9 is advantageous since the operating time of the change-over system is too short to give satisfactory effects with only the neutral switch 4. More particularly, according to a test method in the United States, the gear shift to low position is effected 15 seconds after the engine start while the vehicle is started to move 20 seconds after the engine start. In such circumstances, the change-over system of FIG. 1 is operated only for 15 seconds and would have less effects than when operated for a full period of 20 seconds from the engine start to the vehicle start.

By providing the clutch switch 9 in the manner as shown in FIG. 4, the operation of the change-over system may be extended by 5 seconds (taking into consideration the time period during which the clutch pedal is depressed), allowing a total operation time of 20 seconds.

One of the principal features of the present invention resides in that a three-way solenoid valve 5a in combination with a spring-loaded diaphragm device D is employed as a throttle opener for applying intake manifold vacuum to a vacuum chamber of the diaphragm to open the throttle when the solenoid is energized. Structural details of the three-way solenoid valve 5a will be clear from FIG. 5.

Figure 5:
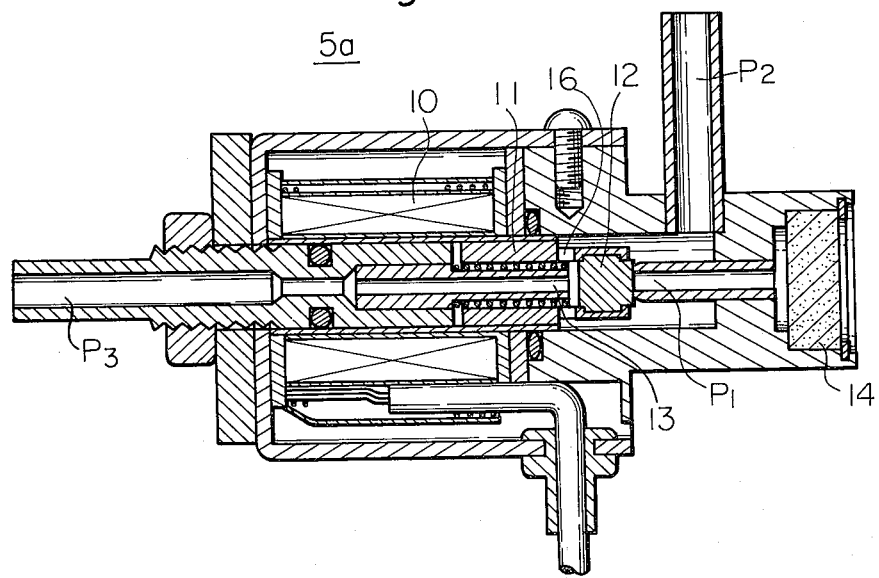
FIG. 5 is a sectional view showing a three-way solenoid valve of the throttle opener employed in the embodiment shown in FIG. 4.

Referring to FIG. 5, the three-way solenoid valve 5a comprises a solenoid coil 10, a valve body 11 accommodated within a housing (no numeral), a valve member 12 formed integral with the valve body 11. When the solenoid 10 is de-energized, the valve member 12 closes a port 13 which communicates with the intake manifold of the engine through a passage P3. It should be noted that FIG. 5 shows the valve in its ON position with a gap of about 0.5 mm between the port 13 and the valve member 12. When the solenoid 10 is de-energized, an air passage P1 which communicates with the atmosphere through a filter 14 is brought into communication with a passage P2 which leads to the vacuum chamber of the diaphragm device D. By the intercommunication between the passages P1 and P2, atmospheric pressure is introduced into the vacuum chamber of the diaphragm device D, holding the throttle valve 5b in a normal idling position by way of a diaphragm rod member (no numeral) connected operatively to the throttle valve 5b.

When the solenoid 10 is energized, the passage P1 is closed by the valve member 12 while the port 13 of the passage P3 is brought into communication with the passage P2 through the gap formed between the valve member 12 and the port 13 and a radial port 16 formed between the valve member 12 and the valve body 11, thereby introducing intake manifold vacuum into the vacuum chamber of the diaphragm device D for opening the throttle valve 5b against the action of the diaphragm spring (no numeral).

Figure 6:
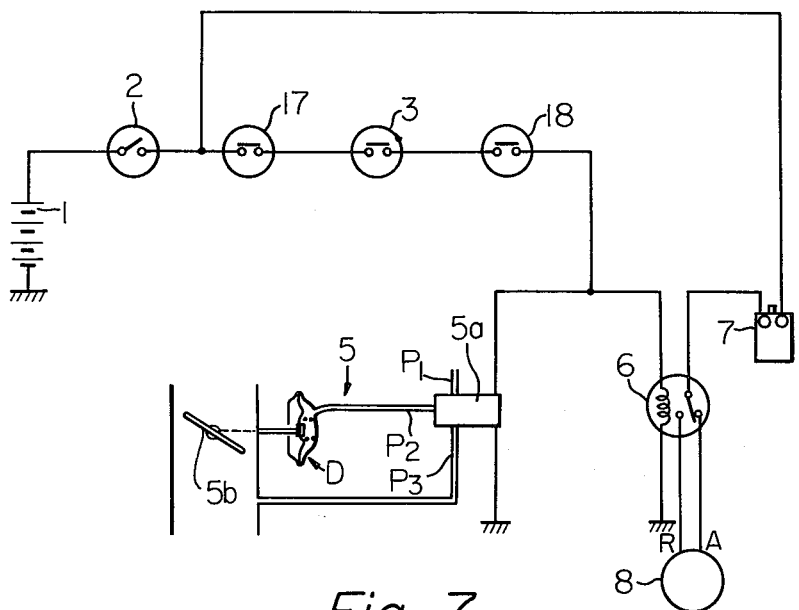
FIG. 6 is a diagram of another preferred embodiment of the present invention.

Referring to FIG. 6 showing a modified FIG. 4 embodiment of the present invention, the ignition timing change-over system employs a different combination of change-over control switches, that is to say, a combination of a vehicle speed switch 17, an acceleration control member switch 18 and the thermostatic switch 3, instead of the combination of the neutral switch 4, clutch switch 9 and thermostatic switch 3 of FIG. 4. The employment of the speed switch 17 may result in a slight increase in the production cost of the system, as compared to the arrangement of FIG. 4. In the modification shown in FIG. 4, there is a possibility of the change-over system being actuated when the clutch pedal of the vehicle is depressed during cruising under low temperature conditions with the thermostatic switch 3 held in its closed position. This may give an uncomfortable feeling to the driver. However, such actuation of the change-over system occurs only during a limited time since the thermostatic switch 3 opens about one minute after the start of the engine. However, if desired, it can be avoided by connecting in series the speed switch 17 which is adapted to close at a vehicle speed below 10 MPH, the switch 18 which is adapted to close when the acceleration control member is released, and the thermostatic switch 3 which is adapted to close when the engine temperature is low, e.g., when the temperature of cooling water or coolant is below 40°C, as shown in FIG. 6. With this arrangement, the system is actuated only during idling immediately after the engine start, when all of the control switches 3, 17 and 18 are closed. The system can be made inoperative upon start of the vehicle when the throttle valve is opened by the driver by depressing the accelerator pedal, thus causing the vehicle to run under normal driving conditions with advanced ignition timing.

It will be appreciated that the system arrangement of FIG. 6 can be used as it is on a motor vehicle with a torque converter.

Figure 7:
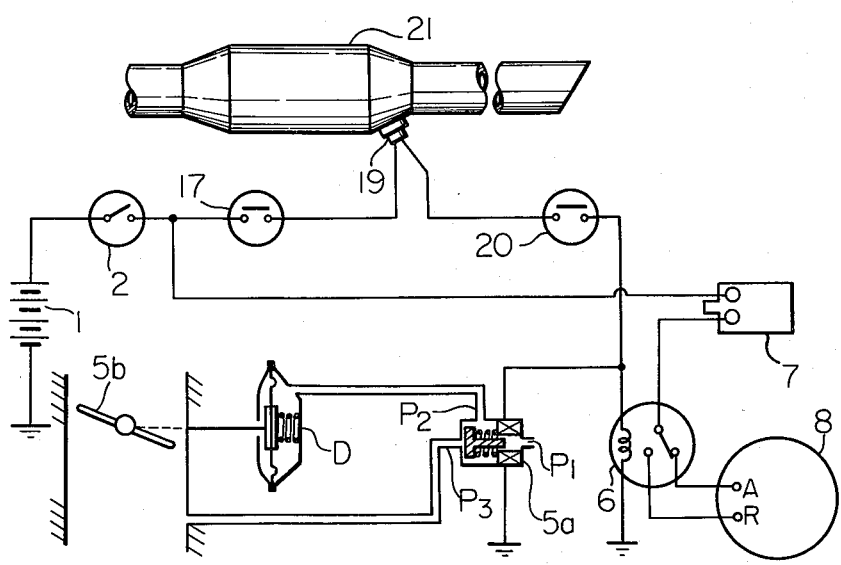
FIG. 7 is a diagram of a further preferred embodiment of the present invention.

FIG. 7 shows a further modified embodiment of the present invention, wherein a catalyst temperature switch 19 and a throttle switch 20 are employed in place of the thermostatic switch 3 which operates in response to engine coolant temperature and the accelerator pedal switch 18 which operates in response to accelerator pedal position. The catalyst temperature switch 19 is mounted on a catalytic converter 21 which is mounted in an exhaust system of the engine. In order to provide a faster warm-up of the exhaust and to promptly attain a catalyst active temperature, it is preferred to provide a thermostatic switch at an output of a catalytic converter in such a manner that the switch 19 is closed below 300°C or in the inactive temperature range of the catalyst. The threshold active temperature of the catalyst is normally about 250°C. According to the U.S. motor vehicle exhaust regulations for 1975 and 1976 which provide for operation modes for hot-restart (LA-4 Mode), when the cooling water temperature at the time of restart is about 80°C while the catalyst is inactive at a restart temperature which is in the vicinity of about 150°C. When these and other conditions are taken into consideration, it seems more advantageous to employ the arrangement of FIG. 7. Experiments show that hydrocarbons and carbon monoxide contained in the exhaust may be reduced by 31% and 43% by weight, respectively, when measured according to the so-called CVS-CH exhaust gas measuring method (Constant Volume Sampling Cold/Hot Weighing Mass Mest) using a C bag (a bag for measurement after restart). FIG. 8 shows temperature variations at the front and rear ends of the catalytic converter 21 during hot restart operations with and without the change-over system of the present invention. It will be seen from this Figure that, when the changeover system is operated, the exhaust temperatures upstream and downstream of the catalytic converter 21 are increased over the entire period of operation, as compared with the temperatures measured without operating the change-over system. It will also be seen that the temperatures upstream and downstream of the catalytic converter are reversed or the temperature downstream of the catalyst surpasses the upstream temperature earlier when the change-over system is operated, presumably due to generation of catalytic reaction heat.

Summing up, the ignition timing change-over system as herein described will cause the ignition spark to retard and the throttle valve opener to open the throttle valve when the engine is idling under given conditions. In the FIG. 4 embodiment idling of the engine is seen attained through switches 2, 3, 4 and 9 being concurrently closed, the idling condition depending on a low engine temperature as well as on the neutral position of the gear shift lever and on the clutch pedal being depressed. In the FIG. 6 embodiment the engine idling condition is seen as being attained through switches 2, 3, 17 and 18 being concurrently closed, the idling condition depending on low engine temperature and the released position of the acceleration control member when the vehicle speed is zero or very low. In the FIG. 7 embodiment the idling condition is seen attained through the closed switches 2, 17, 19 and 20, the idling condition depending on the throttle valve being sensed to be in the engine idling position and the catalyst temperature being below the active temperature when the vehicle speed is zero or very low, but the idling condition being independent of the engine temperature.

It should be noted that, though the distributor is herein shown as a dual point distributor, it may be of a triple point type having the point R which is used exclusively for spark retardation for engine warm-up in addition to an ordinary exhaust controlling dual point distributor. While specific embodiments of the present invention have been disclosed and described in the foregoing, it will be understood that various other modifications within the scope of the invention may be conceived by those skilled in the art. Therefore, it is intended that the scope of the invention is limited only by the appended claims.

What is claimed is:

1. A ignition timing change-over system for a vehicle internal combustion engine having an intake manifold, a throttle valve, an acceleration control member, a gear shift lever and a pedal actuated clutch the system comprising, in combination:

an ignition coil,
a distributor provided with an ignition spark advancing point and ignition spark retarding point for advancing and retarding spark in dependence on engine speed,
a relay switch, the coil of which is normally de-energized for the switch to connect said ignition spark advancing point to said ignition coil,
a dc power source,
an ignition change-over circuit arranged to close when said engine is idling under given conditions for connecting said relay switch coil through an ignition switch to said dc power source to energize said relay switch coil causing said relay switch to switch and connect said ignition spark retarding point with said ignition coil, said ignition change-over circuit including in series a thermostatic switch which is adapted to close at an engine temperature below a predetermined level, a neutral switch which is adapted to close when said gear shift lever is in neutral position, and a clutch switch which is connected in parallel with said neutral switch and adapted to close when said clutch pedal is depressed, and
a throttle valve opener comprising solenoid means connected in parallel with said relay switch coil for opening said throttle valve when said ignition change-over circuit is closed and said ignition spark retarding point is connected to said ignition coil.

2. An ignition timing change-over system as claimed in claim 1, wherein said thermostatic switch is closed at an engine coolant temperature below 40°C.

3. An ignition timing change-over system as claimed in claim 1, wherein the engine cranking includes the engine speed ranging from 0 to 400 r.p.m.

* * * * *